United States Patent [19]

Wilcox, Jr. et al.

[11] Patent Number: 4,646,906

[45] Date of Patent: Mar. 3, 1987

[54] APPARATUS FOR CONTINUOUSLY CONVEYING COAL FROM A CONTINUOUS MINER TO A REMOTE FLOOR CONVEYOR

[75] Inventors: Arnold G. Wilcox, Jr., Shady Spring; Gopal Shah, Beckley, both of W. Va.

[73] Assignee: Fairchild Incorporated, Beckley, W. Va.

[21] Appl. No.: 857,393

[22] Filed: Apr. 21, 1986

Related U.S. Application Data

[63] Continuation of Ser. No. 648,340, Sep. 6, 1984, abandoned, which is a continuation of Ser. No. 409,853, Aug. 20, 1982, abandoned.

[51] Int. Cl.⁴ .............................................. B65G 65/02
[52] U.S. Cl. .................................... 198/303; 198/589
[58] Field of Search ............... 198/302, 303, 587, 589; 299/43–45, 64–67

[56] References Cited

U.S. PATENT DOCUMENTS

| | | | |
|---|---|---|---|
| 2,793,848 | 5/1957 | Moon | 299/65 X |
| 2,805,760 | 9/1957 | Von Stroh et al. | 198/589 X |
| 2,966,984 | 1/1961 | Moon | 198/303 |
| 2,967,701 | 1/1961 | Wilcox | 262/1 |
| 3,306,667 | 2/1967 | Todd | 299/57 |
| 3,621,983 | 11/1971 | Arentzen et al. | 198/303 X |
| 3,879,088 | 4/1975 | Sodder, Jr. et al. | 299/45 X |
| 4,031,997 | 6/1977 | Nelson | 198/303 X |
| 4,159,757 | 7/1979 | Kleysteuber et al. | 198/303 |
| 4,298,232 | 11/1981 | Mendola | 299/64 |
| 4,341,424 | 7/1982 | Wilcox, Jr. et al. | 299/57 |
| 4,382,607 | 5/1983 | Voight | 198/303 X |

Primary Examiner—Joseph E. Valenza
Assistant Examiner—David A. Bucci
Attorney, Agent, or Firm—Cushman, Darby & Cushman

[57] ABSTRACT

Apparatus for use in conveying coal from the conveyor of a continuous miner to a spaced floor conveyor comprising first, second and third cooperating elongated scraper conveyor assemblies each having a coal receiving end and a coal discharging end. The receiving end of said first conveying assembly has a connection with the miner providing for limited tilting movement and for generally horizontal swinging movement with respect thereto in a position to receive the coal discharging from the conveyor of the miner. First and second mounting members extend in cantilever fashion from the receiving end of the second conveyor assembly and the receiving end of the third conveyor assembly respectively. First and second crawler units are disposed below the first and second mounting members respectively. Each crawler unit includes a frame structure, a pair of longitudinally coextensive parallel power driven endless track assemblies connected with the frame structure and a connection for supporting the associated mounting member on the frame structure for limited tilting movement and for horizontal swinging movement about a vertical axis disposed between the associated pair of endless track assemblies and intermediate the longitudinal extent thereof. A carriage assembly and articulated joint serves to mount the discharge end of the first, second and third conveyor assemblies on the receiving end of the second conveyor assembly, third conveyor assembly and floor conveyor respectively for longitudinal movement thereabove for limited tilting movement with respect thereto and generally horizontal swinging movement with respect thereto.

18 Claims, 11 Drawing Figures

APPARATUS FOR CONTINUOUSLY CONVEYING COAL FROM A CONTINUOUS MINER TO A REMOTE FLOOR CONVEYOR

This is a continuation of application Ser. No. 648,340, filed Sept. 6, 1984, which was abandoned upon the filling hereof, and which is a continuation of application Ser. No. 409,853, filed Aug. 20, 1982, now abandoned.

This invention relates to coal mining and more particularly to apparatus for continuously conveying coal produced by the operation of a continuous mining machine to a remote floor conveyor in the mine.

Conventional apparatus of the type herein contemplated is disclosed in commonly-assigned U.S. Pat. No. 3,306,667 dated Feb. 28, 1967. The apparatus disclosed in the patent includes a pair of cooperating elongated conveyor assemblies each having a coal receiving end and a discharge end. The first conveyor assembly is provided with a connection at its receiving end which serves to mount the same on the discharge end of the continuous mining machine for limited tilting movement and for generally horizontal swinging movement with respect thereto in a position to receive the coal discharging from the conveyor of the continuous mining machine. The receiving end of the second conveyor assembly is supported for longitudinal and transverse movement along the mine floor by a skid arrangement. The discharge end of the first conveyor assembly is mounted on the receiving end of the second conveyor assembly for longitudinal movement thereabove for limited tilting movement with respect thereto and for generally horizontal swinging movement with respect thereto as by a rolling carriage so as to discharge the coal from the discharge end of the first conveyor assembly onto the second conveyor assembly in any position of movement with respect thereto. Finally, the discharge end of the second conveyor assembly is mounted on the floor conveyor for longitudinal movement thereabove for limited tilting movement with respect thereto and for generally horizontal swinging movement with respect thereto as by a rolling carriage so as to discharge the coal from the discharge end of the second conveyor assembly onto the floor conveyor in any position of movement with respect thereto.

By virtue of the articulated nature of the connection of the two conveyor assemblies between the continuous miner and the floor conveyor substantial movements of the continuous mining machine with respect to the stationary floor conveyor are accommodated while maintaining a continuous capability of conveying the coal from the continuous mining machine to the floor conveyor. The arrangement disclosed in the aforesaid patent has been produced commercially under the trademark WILCOX ® under the designation "Universal Advance Conveyor". While the Universal Advance Conveyor has proven successful in operation, there is always the need to improve performance by reducing the time required to maneuver the apparatus and by rendering the apparatus more flexible and extensible in its operating mode.

It is an object of the present invention to provide such improvements in apparatus of the type described. In accordance with the principles of the present invention this objective is obtained by providing apparatus which includes three cooperating elongated conveyor assemblies, each of which has a coal receiving end and a coal discharging end. The receiving end of the first conveyor assembly is connected with the continuous mining machine for limited tilting movement and for generally horizontal swinging movement with respect thereto in a position to receive the coal dischargigg from the conveyor of the machine. The second and third conveyor assemblies have first and second mounting members extending in cantilever fashion from the receiving ends thereof respectively and first and second crawler units are disposed below the first and second mounting members respectively. Each crawler unit includes a frame structure and a pair of longitudinally coextensive parallel power driven endless conveyor assemblies connected with the frame structure. Each frame structure supports the associated mounting member for limited tilting movement and for horizontal swinging movement about a vertical axis disposed between the associated pair of endless track assemblies and intermediate the longitudinal extent thereof. The discharge ends of the first and second conveyor assemblies are mounted on the receiving end of the second and third conveyor assemblies respectively for longitudinal movement thereabove for limited tilting movement with respect thereto and generally horizontal swinging movement with respect thereto as by a rolling carriage so as to discharge the coal from the discharge end of the respective first or second conveyor assembly onto the second or third conveyor assembly respectively, in any position of movement with respect thereto. Finally, the discharge end of the third conveyor assembly is mounted on the floor conveyor for longitudinal movement thereabove for limited tilting movement with respect thereto and for generally horizontal swinging movement with respect thereto as by a rolling carriage so as to discharge the coal from the discharge end of the third conveyor assembly onto the floor conveyor in any position of movement with respect thereto.

Preferably, the connections at each end of each conveyor assembly provide in addition to the movements set forth a limited vertical movement as well. Preferably, the frame structure of each crawler unit is provided with a mine floor engaging member which is mounted for power operated vertical movement as by a hydraulic piston and cylinder unit so as to be moved between a raised position above the mine floor with the associated endless track assemblies in mine floor engagement and a lowered position in mine floor engagement with the associated endless track assemblies out of operative mine floor engagement. This arrangement provides the apparatus with a means for extricating the apparatus from a stalled condition caused by an upwardly bulging mine floor which has the effect of removing the weight load from the endless track assemblies of an associated crawler unit so that there is insufficient weight load thereon to effect tractive movement. By effecting movement of the associated floor engaging member into its lowered position so as to effect a relative raising of the endless track assemblies with respect to the floor it then becomes a simple matter to place boards or other members beneath the raised track assemblies and to then effectively lower the endless track assemblies down into traction engagement with the boards or other members by moving the floor engaging member upwardly into its raised position.

These and other objects of the present invention will become more apparent during the course of the following detailed description and appended claims. The invention may best be understood with reference to the accompanying drawings wherein an illustrative embodiment is shown.

Figure 1:
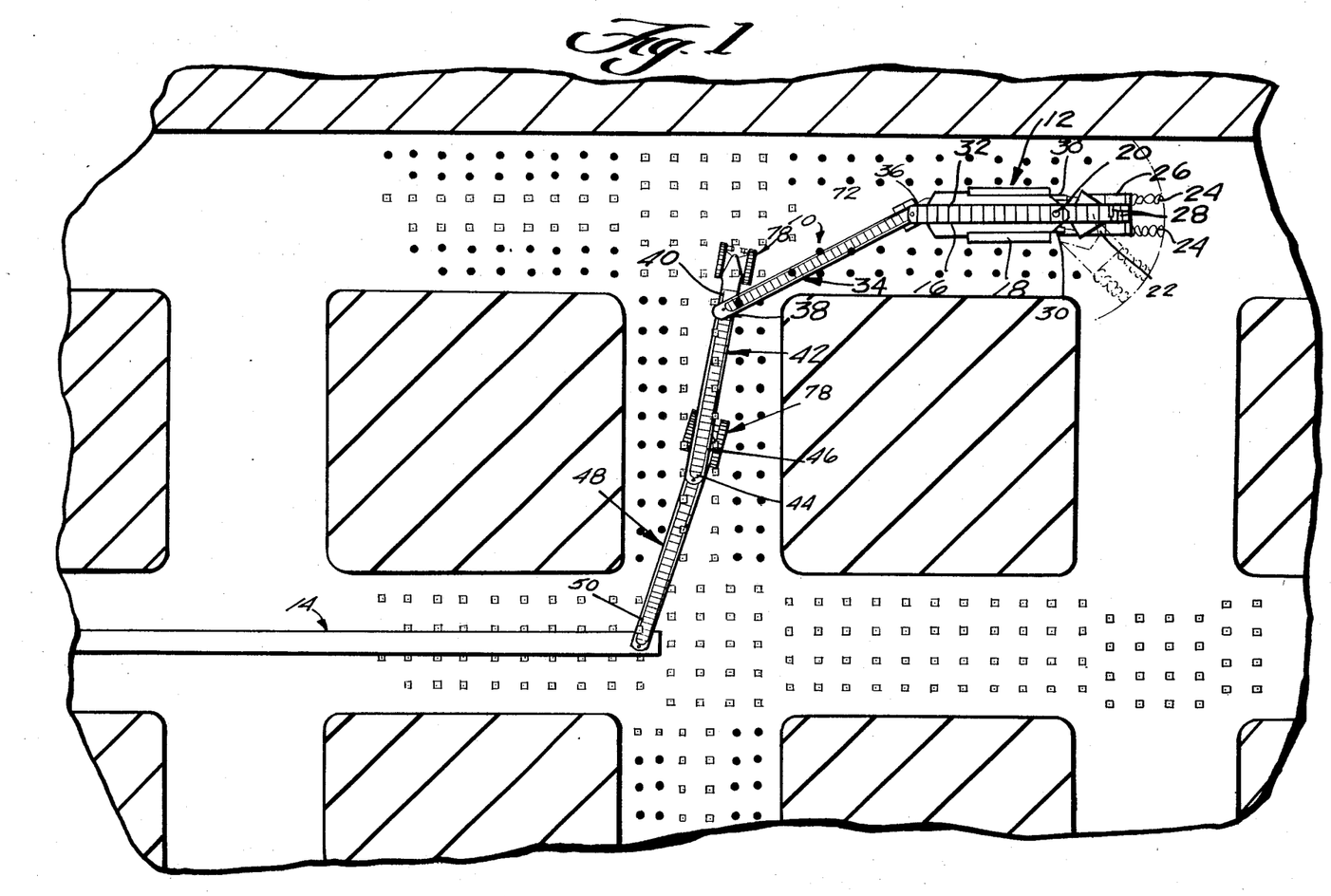
FIG. 1 is a top plan view illustrating an operative position of the apparatus embodying the principles of the present invention within a mine in operative association with a continuous mining machine and a floor conveyor.
Figure 2:
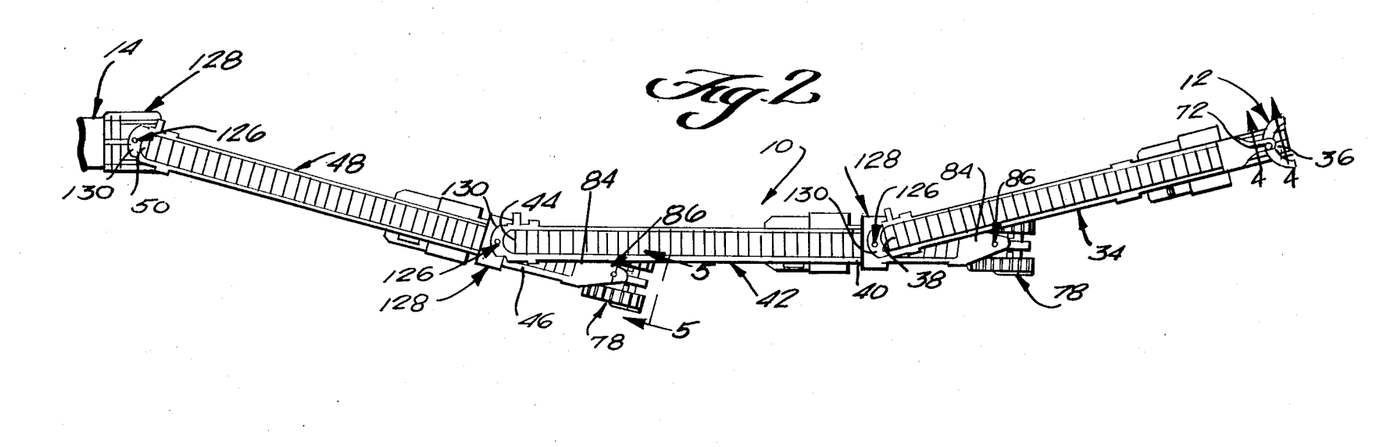
FIG. 2 is an enlarged top plan view of the apparatus shown in FIG. 1.

Referring now more particularly to the drawings, there is shown in FIGS. 1 and 2 a conveyor apparatus, generally indicated at 10, embodying the principles of the present invention. The conveyor apparatus 10 is shown connected between a continuous mining machine, generally indicated at 12, and a floor conveyor, generally indicated at 14.

While the conveyor apparatus 10 of the present invention has general utility with any type of machine capable of working at the mine face and delivering coal removed from the face to the floor conveyor, for purposes of illustration a dual auger type, low seam, short wall continuous mining machine 12 has been shown in conjunction therewith. Here again, the conveyor apparatus 10 would have utility with other types of continuous mining machines but is particularly suited to the machine 12 illustrated, which constitutes the WILCOX Mark 22 Continuous Miner manufactured by Fairchild, Incorporated of Beckley, W.Va., the details of construction and operation of which are disclosed in commonly assigned application Ser. No. 199,363, filed Oct. 21, 1980 now U.S. Pat. No. 4,341,424, the disclosure of which is hereby incorporated by reference into the present specification. Other continuous mining machines to which the present subject matter is particularly applicable includes the WILCOX Mark 20 Continuous Miner which is constructed in accordance with the principles set forth in Wilcox U.S. Pat. No. 2,967,701, the disclosure which is hereby incorporated by reference into this application. In brief, the machine 12 includes a main frame 16 which is supported for movement along the mine floor by a pair of crawler units or endless track assemblies 18. Mounted forwardly of the main frame 16 for pivotal movement about a vertical axis 20 is a cutter carrying frame 22. Disposed forwardly of the cutter carrying frame 22 for independent vertical movement is a pair of auger cutters 24, each including a longitudinally extending shaft having a pair of helical blades mounted thereon, the blades being spaced longitudinally from each other approximately 180°. Formed on the forward end of each auger cutter is a cutting head having a plurality of cutting teeth mounted therein and each helical blade has a plurality of longitudinally spaced peripheral cutting teeth extending outwardly therefrom. As shown, the helical blades of the auger cutters are oppositely pitched with respect to one another.

The rearward end of the shaft of each auger cutter 24 is mounted in a vertically swingable arm assembly 26 which is capable of being pivoted about a longitudinally extending axis, by any suitable means, such as a hydraulic piston and cylinder unit 28. It will be understood that a suitable motor or the like (not shown) is mounted with the frame and is connected to the auger cutters through the arm assemblies 26 so as to effect rotation of the auger cutters about their axes in opposite directions.

The entire machine 12 is advanced forwardly by operation of the endless track assemblies 18. The cutter carrying frame 22 is pivoted horizontally about the vertical axis 20 by a pair of hydraulic ram units 30. The various different cycles of operation of the machine 12 are disclosed in detail in the aforesaid copending application to which reference may be had if desired.

For present purposes, it is sufficient to note that the coal removed from the face by the auger cutters 24 is conveyed laterally inwardly as by forwardly moving scrolls or the like (not shown), into a central scraper conveyor assembly 32 having an operative upper flight extending upwardly and rearwardly from the forward end of the machine and then horizontally rearwardly beyond the rearward end of the main frame 16 thereof.

Figure 3:
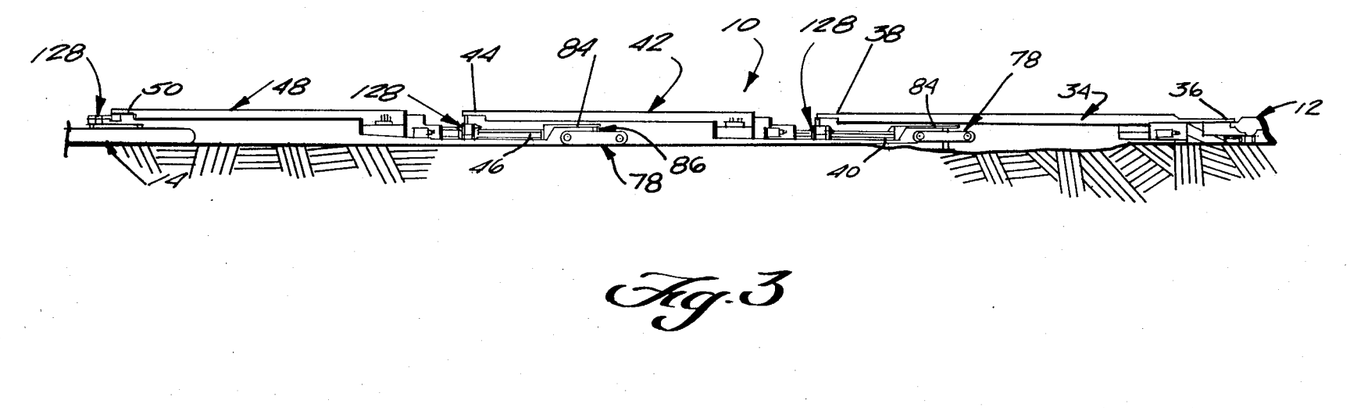
FIG. 3 is a side elevational view of the apparatus shown in FIG. 2.

Referring now more particularly to FIGS. 2 and 3 of the drawings, the conveyor apparatus 10 of the present invention consists essentially of three main components, each of which is in the form of an elongated conveyor section or assembly. One of the conveyor assemblies, designated generally by the numeral 34, has a receiving end 36 suitably connected to receive coal discharging from the discharge end of the central scraper conveyor assembly 32 of the machine 12. Conveyor assembly 34 includes a discharge end 38 which is connected to deposit coal conveyed thereby onto a receiving end 40 of the second conveyor assembly, generally indicated at 42. The second conveyor assembly 42 includes a discharge end 44 which is disposed to transfer coal conveyed thereby onto a receiving end 46 of the third conveyor assembly, generally indicated at 48. The third conveyor assembly 48 includes a discharge end 50 which is mounted to discharge coal conveyed by the conveyor assembly 48 onto the floor conveyor 14.

The conveyor assemblies 34, 42 and 48 are formed of conventional conveyor structure, either of the scraper type as shown, or of the belt type. As shown, each of the conveyor assemblies includes a frame formed essentially of a pair of longitudinally extending side rails 52 rigidly interconnected in transversely spaced relation by upper and lower central plates 54 and 56 extending therebetween, see for example, FIG. 8. The scraper portion of each conveyor assembly is of the dual chain type formed essentially of a pair of endless chains 58 having a series of longitudinally spaced flights 60 extending laterally or transversely therebetween. It will be understood that in accordance with standard practice the chains are trained about sprocket wheels (not shown) fixed to shafts journaled on the receiving and discharging ends of the associated conveyor assemblies. It will also be understood that each conveyor assembly also includes an appropriate electric motor or the like (not shown) for driving one of the shafts and hence moving the associated endless chain 58 in a direction such that an operative upper run of flights 60 move over the associated upper plate 54 in a direction from the receiving end to the discharge end thereof.

Figure 4:
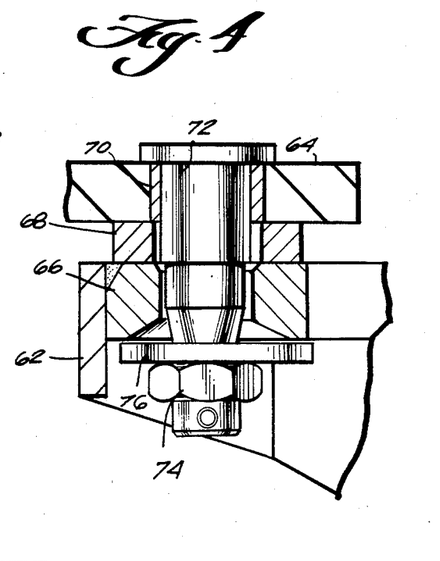
FIG. 4 is an enlarged fragmentary sectional view taken along the line 4—4 of FIG. 2.

The receiving ends of all of the conveyor assemblies are mounted so that the associated conveyor assembly can have a swinging movement in a horizontal plane about a vertical axis and a limited tilting movement in a vertical plane about a horizontal axis. Preferably, connections at the receiving ends of the second and third conveyor assemblies also provide for a limited amount of vertical movement. In the case of the receiving end 36 of the first conveyor assembly 34 a connection affording the two functional movements common to all is provided between the discharge end of the conveyor 32 of the machine 12 and the receiving end 36 of the conveyor assembly 34. This connection may be similar to the connection provided between the mining machine and first conveyor section in the aforesaid U.S. Pat. No. 3,306,667. A simple connection which is preferably utilized is illustrated in FIG. 4. As shown, a rearwardly extending rigid portion 62 of the frame of the conveyor assembly 32 of the mining machine 12 is disposed in underlying relation to a mounting member 64 fixed to the frame of the receiving end 32 of the first conveyor assembly 34. The frame portion 62 carries a pin receiving ring 66 having an annular spacer bearing 68 disposed thereabove. The mounting member 64 is provided with a sleeve bearing 70 through which a headed pin 72 is journaled. Pin 72 extends through the spacer bearing 68 and ring 66 in annularly spaced relation sufficient to provide a limited amount of tilt as, for example, 2°. The lower end of the pin is threaded to receive a bolt 74 which serves to retain a washer 76 in a position below ring 66. It will be noted that the slight spacing between ring 66 and washer accommodates the aforesaid 2° tilting movement. The limited amount of vertical movement provided is functionally insignificant as compared with that embodied in the connections at the receiving ends of the second and third conveyor assemblies. The spacing provided is similar to that provided for the 2° tilt, however, functionally the limited 2° tilting movement reflects in a significant amount of vertical swinging movement measured at the discharge end 38 of the first conveyor assembly 34.

The receiving ends of the second and third conveyor assemblies 42 and 48 are mounted in a manner sufficient to accomplish the aforesaid three functional movements by a connection formed between a crawler unit, generally indicated at 78, and the receiving end of the associated conveyor assembly which provides the aforesaid three functional movements.

Figure 5:
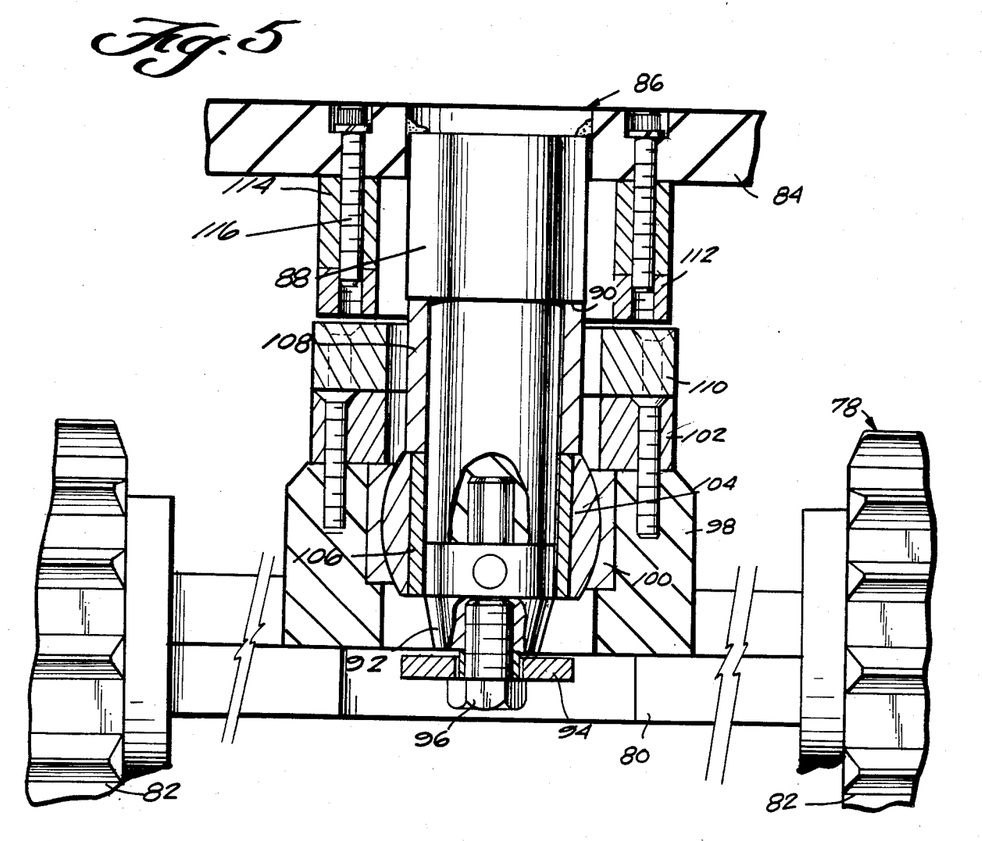
FIG. 5 is an enlarged fragmentary sectional view taken along the line 5—5 of FIG. 2.
Figure 6:
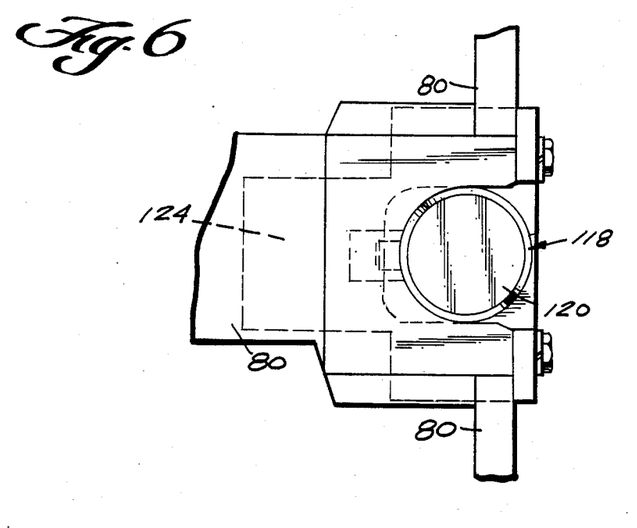
FIG. 6 is an enlarged fragmentary top plan view illustrating the mount of the mine floor engaging member on the central rear end portion of the frame of the crawler unit.

As best shown in FIG. 5, each crawler unit 78 includes a crawler frame structure 80 which carries a pair of longitudinally coextensive parallel power driven endless track assemblies 82. The endless track assemblies are of conventional construction and each is independently power driven and controlled in the usual way for movement in either one of two opposite directions. The receiving end of the associated conveyor assembly 42 or 48 is constructed so as to include a rigid mounting member 84 extending in cantilever fashion from the receiving end so as to overlie the central portion of the associated crawler unit 78. A three movement connection assembly, generally indicated at 86, serves to connect each mounting member 84 to the central portion of the associated crawler unit frame 80 disposed therebelow. As best shown in FIG. 5, the connection assembly 86 includes a stepped pivot pin 88 fixed, as by welding or the like, to an appropriate aperture formed in the mounting member 84 so as to extend downwardly to a position adjacent the associated crawler unit frame 80. As shown, pin 88 is formed with an intermediate downwardly facing shoulder 90 and a diminishingly tapered frustoconical lower end portion 92 to which is mounted a stop washer or pin retainer 94, as by a bolt 96.

Fixed to the upper surface of the central portion of the crawler unit frame structure 80 is a swivel bearing mounting member 98 within which an outer race 100 of a swivel bearing is mounted, as by a ring-shaped bearing cap 102. The swivel bearing includes an inner race 104 which engages a sleeve bearing 106 which rotatably receives the reduced lower end portion of the pin 88. A spacer sleeve 108 extends between the bearing sleeve 106 and the shoulder 90 of the pin 88. The arrangement is such that pin 88 fixed to the mounting member 84 is rotatable about the vertical axis of the sleeve bearing 106 and for tilting movement about the swivel axis provided by the outer and inner races of the swivel bearing 100 and 104. The vertical axis of rotation is disposed with respect to the endless track assemblies 82 transversely centrally between the longitudinal coextensive extent thereof.

In order to limit the extent of tilting movement which can take place about a horizontal axis extending longitudinally with respect to the associated conveyor assembly, a wear ring 110 is fixedly mounted on the upper end of the bearing retainer cap 102 and two tilt limiter members 112 are adjustably fixedly mounted beneath the mounting member 84, as by spacers 114 and bolts 116. It will also be noted that since pin retainer 94 is disposed below the sleeve bearing race 104 the pin 88 has the capability of a limited amount of vertical movement within the bearing sleeve 106. However, because the mounting member 84 and associated conveyor assembly end is normally supported by the crawler unit 78, the pin will normally be disposed in the weight supporting lower limiting position shown in FIG. 5.

It sometimes occurs in the operation of the conveyor apparatus 10, due to the inevitable irregularities in the mine floor, that the central portion of the second or third conveyor assembly 42 or 48 will engage a high point in the floor or the endless track assemblies 82 of the crawler units 78 will engage a low point in the mine floor resulting in the weight of the conveyor assembly being supported directly on the mine floor, rather than the crawler unit, in such a way that the endless track assemblies 82 loose their traction with the mine floor and hence their ability to move the associated conveyor assembly, as desired. In order to extricate the conveyor apparatus under these circumstances, each crawler unit frame structure 80 has mounted thereon in a position longitudinally rearwardly from the associated connection 86 a mine floor engaging assembly, generally indicated at 118. The assembly 118 is preferably in the form of a simple conventional hydraulic piston and cylinder unit which includes a cylinder 120 fixed to the crawler unit frame structure 80 by welding or the like, a piston rod 122 carrying a piston (not shown) on the upper end which is slidably mounted within the cylinder 120 and a mine floor engaging plate 124 on the lower end thereof.

Figure 7:
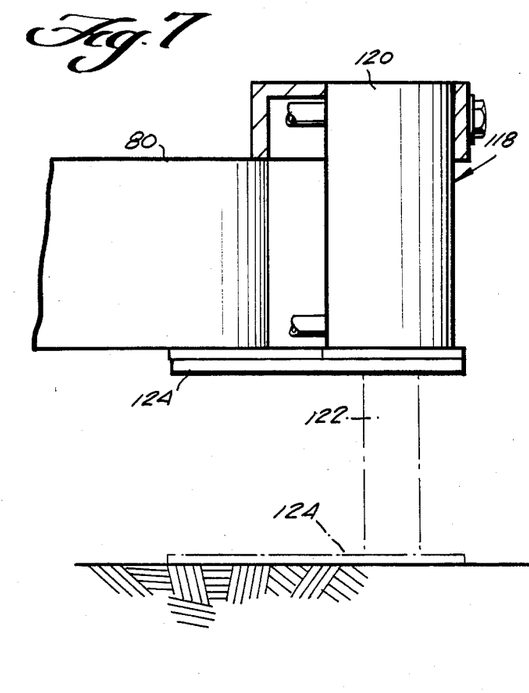
FIG. 7 is a fragmentary sectional view of the structure shown in FIG. 6.

As shown, the cylinder 120 is of the double acting hydraulic type capable of power actuated movement into both its raised storage position and its lowered crawler unit elevating floor engaging position, as shown in phantom lines in FIG. 7. The manner in which the assembly 118 is utilized to extricate the conveyor apparatus 10 from a bottomed out condition such as indicated above is for the operator to actuate the cylinder 120 of the assembly 118 to move the floor engaging member 124 from its retracted raised position downwardly into its extended lower position. This movement has the effect of raising the endless track assemblies 82 of the associated crawler unit 78 above the mine floor enabling the operator to position railroad ties or similar elements therebelow so that upon actuation of the cylinder 120 in the opposite direction to raise the floor engaging member 124, the endless track assemblies 82 will be lowered into tractive engagement with the railroad ties or other elements placed beneath the same. This enables the operator to actuate the endless track assemblies to move the associated crawler unit 78 along the elements to the next desired position.

The discharge ends 38, 44 and 50 of the conveyor assemblies 34, 42 and 48 respectively have connections which are essentially the same, each including an articulated joint or connection, generally indicated at 126, and a rolling carriage assembly, generally indicated at 128. As best shown in FIGS. 8–11 each articulated joint connection 126 is provided between a forward extension 130 formed as a rigid part of the associated conveyor assembly frame structure. Each extension 130 is apertured, as indicated at 132, to receive a sleeve bushing 134 which, in turn, has journaled therein the upper headed portion of a pin 136. The lower portion of the pin 136 extends through an intermediate spacer sleeve 138 and an abutting lower sleeve bearing 140. The exterior periphery of the sleeve bearing 140 has mounted therein an inner race 142 of a cylindrical bearing, an outer race 144 of which is fixed within a mounting ring 146 forming a part of the associated carriage assembly 128. The outer race 144 of the bearing assembly is detachably retained within the mounting ring 146 as by a bearing cap or washer 148.

Each connection 126 is similar to the connection 84 previously described in that it provides for horizontal swinging movement of the associated conveyor assembly about the vertical axis of the pin 136 and for a tilting movement of the associated conveyor assembly in a vertical plane about a horizontal axis provided by the cooperation between the inner and outer races 142 and 144 of the swivel bearing. Each connection 126 is similar to the connection 86 previously described in also providing for a limited amount of vertical movement. In this regard, the lower extremity of the pin 136 is of reduced diameter and extends below the spherical bearing defined by the inner and outer races 142 and 144. Mounted on the reduced lower threaded end portion of the pin 136, as by a bolt 150, is a stop washer 152. The washer 152 limits the amount of vertical movement provided by the connection 126 by virtue of the engagement of the sleeve bearing 140 and inner race 142. It will be noted that the extent to which the connection 126 provides for tilting movement is limited by virtue of the engagement of the washer 152 within the interior periphery of the mounting ring 146.

Figure 8:
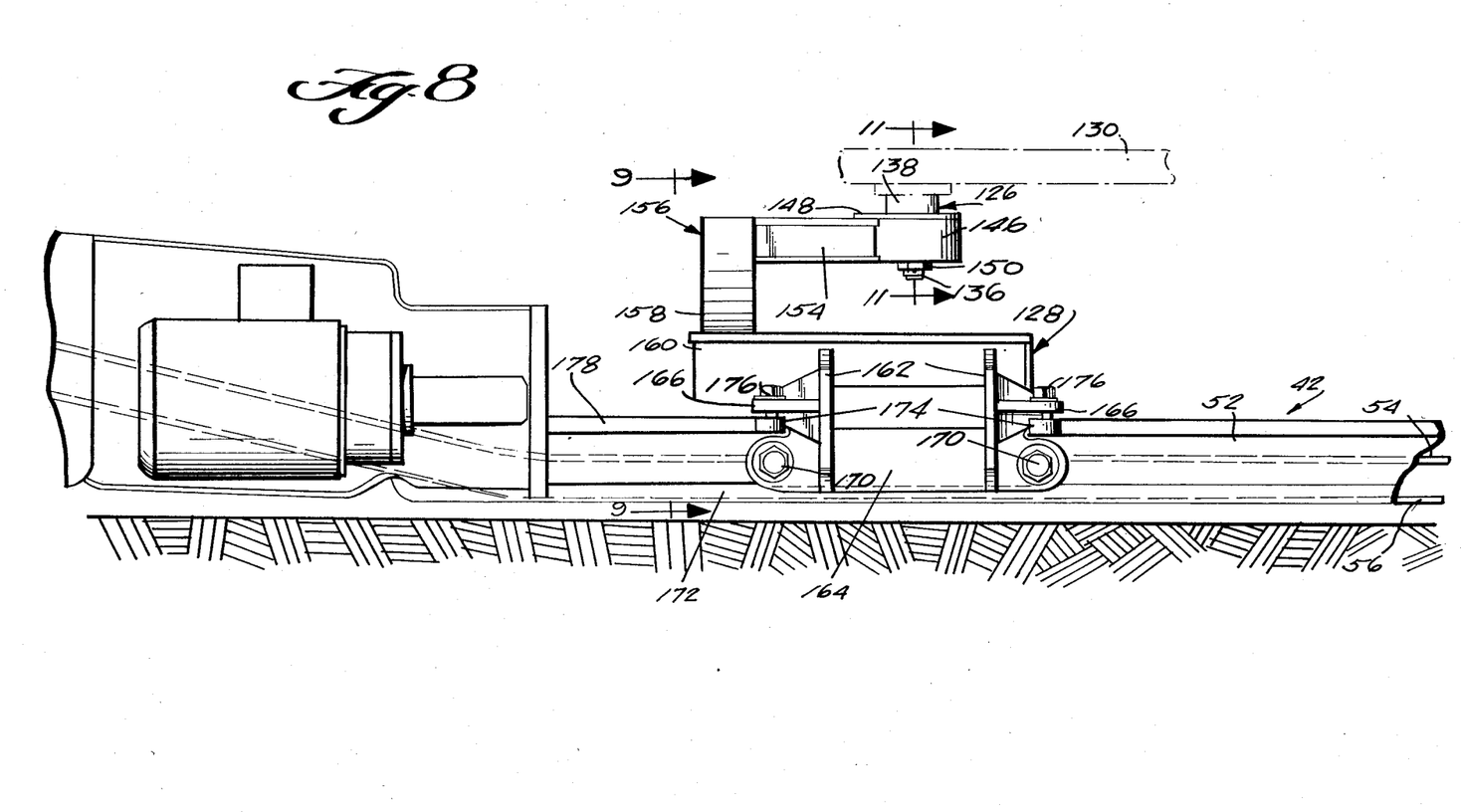
FIG. 8 is a fragmentary side elevational view of one of the conveyor assemblies showing the manner in which the carriage assembly of an adjacent conveyor assembly is mounted thereon.
Figure 9:
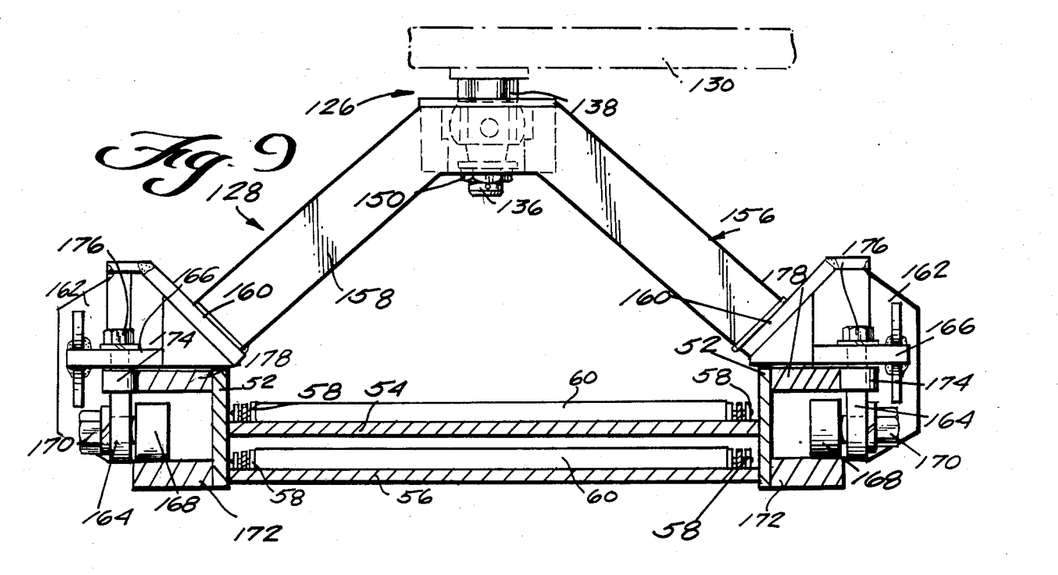
FIG. 9 is a sectional view taken along the line 9—9 of FIG. 8.
Figure 10:
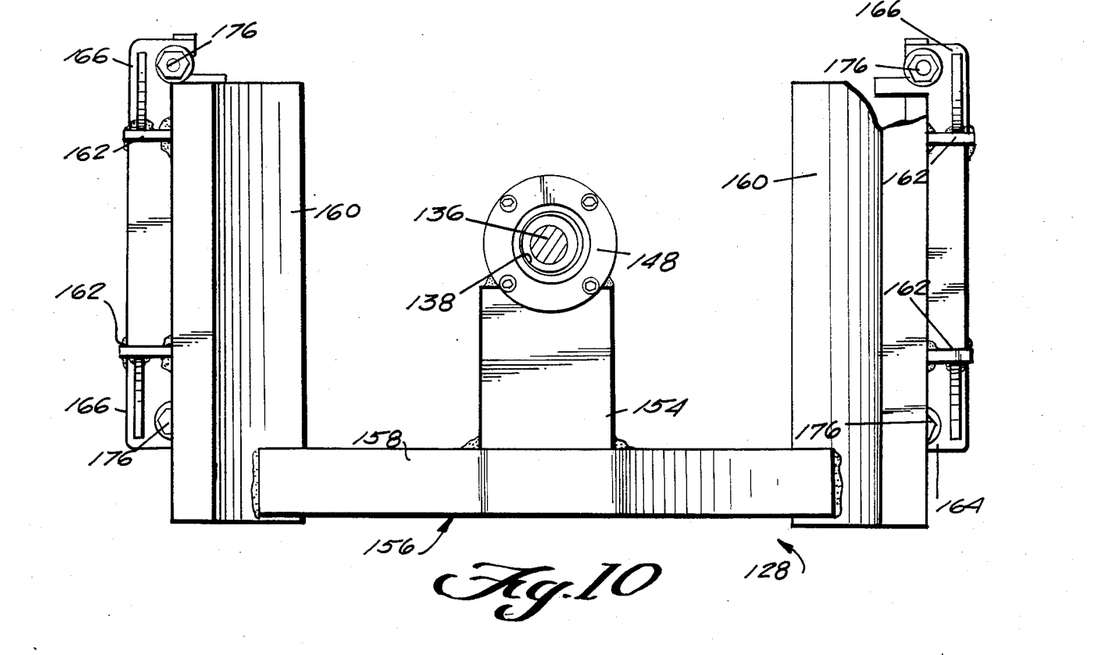
FIG. 10 is a top plan view of the carriage assembly shown in FIGS. 8 and 9.
Figure 11:
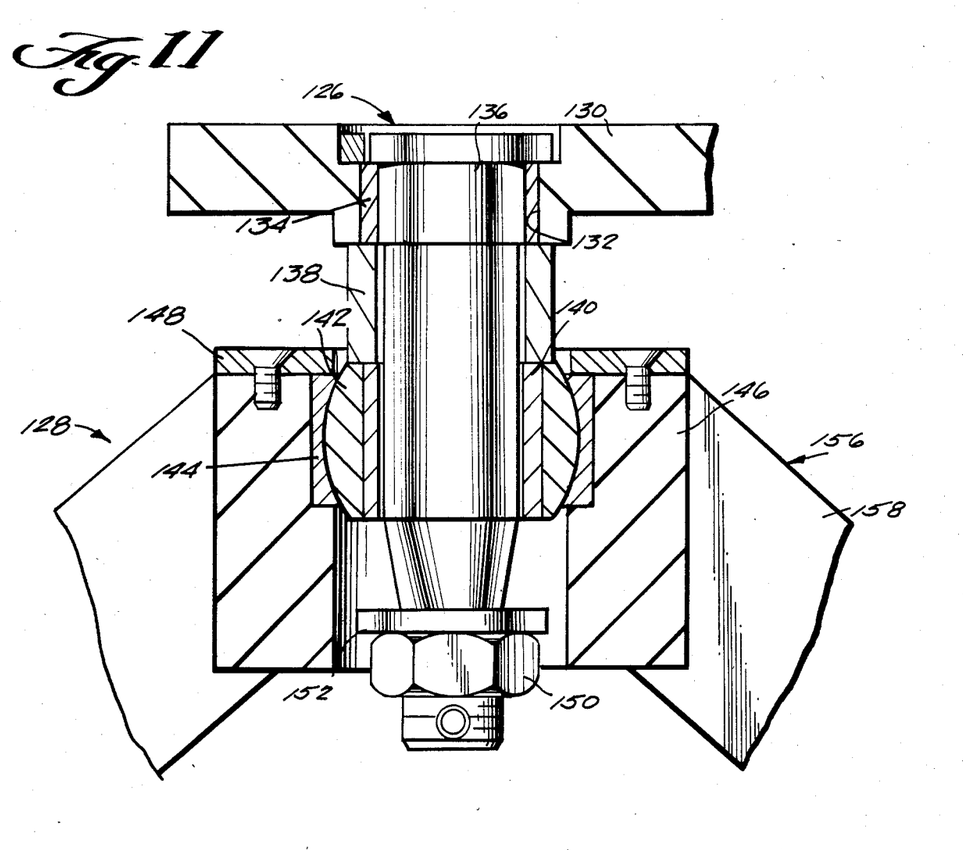
FIG. 11 is an enlarged fragmentary sectional view taken along the line 11—11 of FIG. 8.

As best shown in FIGS. 8, 9 and 10, the mounting ring 146 is fixedly secured, as by welding or the like, to the rearward end of a central frame member 154 forming a part of a frame structure, generally indicated at 156, embodied in the associated carriage assembly 128. The frame structure 156 also includes an inverted V-shaped frame member 158 which has its apex rigidly fixed, as by welding or the like, to the forward end of the central frame member 154. The free ends of the legs of the inverted V-shaped frame member 158 are fixedly secured, as by welding or the like, to a pair of longitudinally extending inclined plates 160. Each of the inclined plates 160 forms a rigid part of a roller carrying subassembly which also includes a pair of transversely extending longitudinally spaced gusset plates 162 suitably welded to the lower transversely outwardly facing surfaces of the plates 160, a lower vertically disposed longitudinally extending mounting plate 164 rigidly supported by the gusset plates 162 and a pair of horizontally disposed longitudinally aligned mounting plates 166 extending forwardly and rearwardly from the central portion of the gusset plates 162. Each mounting plate 164 serves to rotatably mount a pair of longitudinally spaced rollers 168 rotatably about transversely extending horizontal axes, as by stub shaft assemblies 170, fixed to the ends of the associated mounting plate 164. The pairs of rollers 168 serve to support the carriage assembly 128 for rolling movement longitudinally along the associated conveyor assembly, as by horizontally extending rails or tracks 172. In the case of the carriage assemblies 128 associated with the discharge end 38 of the first conveyor assembly 34 and the discharge end 44 of the second conveyor assembly 42, the associated rails or tracks 172 are mounted on the conveyor frame side walls 52 adjacent the receiving end 40 of the associated conveyor assembly 42 or the receiving end 46 of the associated third conveyor assembly 48 respectively. As is clearly shown in FIG. 3, the frame structures of the second and third conveyor assemblies are configured so that the receiving end portions to which the roller tracks 172 are affixed and positioned adjacent the mine floor and below the associated discharge end portion of the frame structure. It will be understood that intermediate portions of the frame structure of both the second and third conveyor assemblies are inclined to provide a transition between the difference in the elevation between the straight lower receiving end portions and the straight upper discharge end portions.

In order to retain the rollers 168 of each carriage assembly 128 in rolling contact with the associated tracks 172, a guide roller 174 is mounted below each mounting plate 166 as by a vertically extending stub shaft assembly 176. The transversely inward periphery of the rollers 174 is adapted to engage the transversely outwardly facing surface of an associated track 178 fixed to the associated side frame wall 52 in a position above the associated track 172. It will be understood that floor conveyor 14 likewise is provided with tracks 172 and 178 for rollingly supporting the carriage assembly 128 associated with the discharge end 50 of the third conveyor assembly 48.

The operation of the conveyor apparatus 10 in conjunction with the continuous mining machine 12 and floor conveyor 14 is illustrated in FIG. 1. Each crawler unit 82 is provided with separate controls that enable an operator to actuate either or both of the associated endless track assemblies so as to move the associated receiving end of the second or third conveyor assemblies to a desired position along the mine floor between the position to which the mining machine 12 is working at the face and the position at which the receiving end of the floor conveyor 14 is operating to move the coal out of the mine. The functional movements provided by the connections 86 between each crawler unit 78 and the associated conveyor assembly receiving end supported thereby enables the operator to manipulate the crawler unit to move in substantially any direction. Means (not shown) is provided for limiting the swinging movement of the crawler frame structure 80 about the vertical axis of pin 88 to 180° so as to prevent wind-up of hydraulic lines extending thereto. With the 180° movement, however, the operator has the capability of turning the crawler unit frame structure 80 about the central axis of the pin 88 into any angular position of extent of the endless track assemblies 82 simply by reversing the direction of movement of the latter. Once the endless track assemblies are aligned in any angular position, movement in either direction can be accomplished by simply actuating both endless track assemblies in that direction. As each crawler unit 78 is moved along the mine floor the conveyor assembly whose receiving end is supported thereon can accommodate the movement by swinging horizontally about the vertical axis of the pin 88 or by tilting vertically about the axis provided by the swivel bearing races 100 and 104. Tilt limiters 112 effectively prevent the associated conveyor assembly from pivoting about a horizontal axis extending longitudinally with respect to the associated conveyor assembly. Movement imparted to the receiving end of the second conveyor assembly 42 or the receiving end of the third conveyor 48 by the associated crawler units 82 is accommodated insofar as the discharge end of the associated conveyor sections is concerned by virtue of the connection 126 and carriage assembly 128 associated therewith. The connection 126 permits the associated conveyor assembly to swing relative to the associated carriage assembly 128 horizontally about the vertical axis of pin 136 and to tilt relative to the associated carriage assembly in a vertical direction about a horizontal axis provided by the inner and outer races 142 and 144 of the associated spherical bearing, while the carriage assembly itself accommodates rolling movement longitudinally along the associated tracks. The first conveyor assembly 34 constitutes in essence a bridge conveyor assembly which extends at all times between the discharge end of the conveyor assembly 32 of the mining machine 12 and the associated carriage assembly 128 riding on the receiving end 40 of the second conveyor assembly 42. The connections as aforesaid permit swinging movement of the first conveyor section horizontally and tilting movements vertically.

In addition to the above functional movements which normally occur in the operation of the conveyor apparatus 10, each of the connections 86 and 126 provides for a limited amount of vertical movement in situations where the utilization of floor engaging assemblies 118 are required, as aforesaid.

It thus will be seen that the objects of this invention have been fully and effectively accomplished. It will be realized, however, that the foregoing preferred specific embodiment has been shown and described for the purpose of illustrating the functional and structural principles of this invention and is subject to change without departure from such principles. Therefore, this invention includes all modifications encompassed within the spirit and scope of the following claims.

What is claimed is:

1. Apparatus for use in conveying a supply of coal supplied by a machine working at a mine face to a spaced floor conveyor arranged to convey the coal away from the face comprising:

first, second and third cooperating elongated conveying means each having a coal receiving end and a coal discharging end:

means for positioning the receiving end of said first conveying means in a position to receive a supply of coal which has been supplied by the working machine and for enabling the first conveying means to be swung horizontally and tilted to a limited extent, first and second mounting members extending in cantilever fashion from the receiving end of said second conveying means and the receiving end of said third conveying means respectively, first and second crawler units disposed below said first and second mounting members respectively, each of said crawler units including a frame structure, a pair of longitudinally coextensive parallel endless track assemblies connected with said frame structure, means for supporting the associated mounting member on said frame structure for limited tilting movement and for horizontal swinging movement about a vertical axis disposed between the associated pair of endless track assemblies and intermediate the longitudinal extent thereof, and power operated means for selectively independently driving each endless track assembly in either direction so as to permit said frame structure to be pivoted horizontally about said vertical axis in response to said endless truck assemblies being driven at equal speeds in opposite directions to thereby enable the frame structure to be moved from any pivotal position into which it has been moved, as aforesaid, rectilinearly in either direction in response to said endless track assemblies being driven at equal speeds in said direction, means mounting the discharge end of said first conveying means on the receiving end of said second conveying means for longitudinal movement thereabove for limiting tilting movement with respect thereto and generally horizontal swinging movement with respect thereto so as to discharge the coal from the discharge end of said first conveying means onto the second conveying means in any position of movement with respect thereto, means mounting the discharge end of said second conveying means on the receiving end of said third conveying means for longitudinal movement thereabove for limited tilting movement with respect thereto and for generally horizontal swinging movement with respect thereto so as to discharge the coal from the discharge end of said second conveying means onto the third conveying means in any position of movement with respect thereto, and means for mounting the discharge of said third conveying means on the floor conveyor for longitudinal movement thereabove for limited tilting movement with respect thereto and for generally horizontal swinging movement with respect thereto so as to discharge the coal from the discharge end of said third conveying means onto the floor conveyor in any position of movement with respect thereto.

2. Apparatus as defined in claim 1 wherein the means mounting the discharge end of said first conveying means on the receiving end of said second conveying means comprises first tracks extending horizontally along opposite sides of the receiving end portion of said second conveying means, a first carriage assembly rollingly supported on said first tracks and a first articulating joint between said first carriage assembly and the discharge end of said first conveying means.

3. Apparatus as defined in claim 2 wherein the means mounting the discharge end of said second conveying means on the receiving end of said third conveying means comprises second tracks extending horizontally along opposite sides of the receiving end portion of said third conveying means, a second carriage assembly rollingly supported on said second tracks and a second articulating joint between said first carriage assembly and the discharge end of said first conveying means.

4. Apparatus as defined in claim 3 wherein each joint includes a spherical bearing providing said limited tilting movement so as to enable the associated conveying means to swing vertically about a transverse horizontal axis passing through the center of said spherical bearing.

5. Apparatus as defined in claim 4 wherein each said joint also includes a vertical pin carried by the associated conveying means and extending through said spherical bearing so as to define the associated axis of horizontal swinging movement.

6. Apparatus as defined in claim 5 wherein each said joint also includes a stop washer on the lower end of said pin spaced below said spherical bearing so as to enable a limited amount of vertical movement to take place between the associated conveying means and carriage assembly.

7. Apparatus as defined in claim 6 wherein means supporting each mounting member on the associated crawler unit frame structure includes a connection having a spherical bearing providing said limited tilting movement so as to enable the associated conveying means to swing vertically about a transverse horizontal axis passing through the center of said spherical bearing.

8. Apparatus as defined in claim 1 wherein said first, second and third conveying means comprises first, second and third scraper conveyor assemblies.

9. Apparatus as defined in claim 1 wherein means supporting each mounting member on the associated crawler unit frame structure includes a connection having a spherical bearing providing said limited tilting movement so as to enable the associated conveying means to swing vertically about a transverse horizontal axis passing through the center of said spherical bearing.

10. Apparatus as defined in claim 9 wherein each said connection also includes a vertical pin fixed to the associated mounting member and extending through said spherical bearing so as to define the associated axis of horizontal swinging movement.

11. Apparatus as defined in claim 10 wherein each said connection also includes a stop washer on the lower end of said pin spaced below said spherical bearing so as to enable a limited amount of vertical movement to take place between the associated mounting member and crawler unit frame structure.

12. Apparatus as described in claim 1 wherein each of said crawler units includes a floor engaging member mounted on the associated frame structure for vertical movement with respect thereto and power operated means for effecting vertical movement of said ground engaging member between a raised position above the mine floor with the associated endless track assemblies in mine floor engagement and a lowered position in mine floor engagement with the associated endless track assemblies out of operative mine floor engagement.

13. In an apparatus for use in conveying a supply of coal supplied by a machine working at a mine face to a spaced floor conveyor arranged to convey the coal away from the face of the type including a plurality of cooperating elongated conveying means each having a coal receiving end and a coal discharging end in which the trailing one of said conveying means includes means for mounting the discharge end thereof on the floor conveyor (1) for longitudinal movement thereabove (2) for limited tilting movement with respect thereto and (3) for generally horizontal swinging movement with respect thereto so as to discharge the coal from the discharge end of said trailing conveying means onto the floor conveyor in any position of movement with respect thereto and means is provided for mounting the discharge end of an adjacent leading conveying means on the receiving end of said trailing conveying means (1) for longitudinal movement thereabove (2) for limiting tilting movement with respect thereto and (3) for generally horizontal swinging movement with respect thereto so as to discharge the coal from the discharge end of said adjacent leading conveying means onto the trailing conveying means in any position of movement with respect thereto, the improvement which comprises:

a mounting member extending in cantilever fashion from the receiving end of said trailing conveying means, a crawler unit disposed below said mounting member, said crawler unit including a frame structure, a pair of longitudinally coextensive parallel endless track assemblies connected with said frame structure, means for supporting the associated mounting member on said frame structure (1) for limited tilting movement and (2) for horizontal swinging movement about a vertical axis disposed between the associated pair of endless track assemblies and intermediate the longitudinal extent thereof, and power operated means for selectively independently driving each endless track assembly in either direction so as to permit said frame structure to be pivoted horizontally about said vertical axis in response to said endless track assemblies being driven at equal speeds in opposite directions to thereby enable the frame structure to be moved from any pivotal position into which it has been moved, as aforesaid, rectilinearly in either direction in response to said endless track assemblies being driven at equal speeds in said direction.

14. The improvement as defined in claim 13 wherein said means supporting said mounting member on the said crawler unit frame structure includes a connection having a spherical bearing providing said limited tilting movement so as to enable the trailing conveying means to swing vertically about a transverse horizontal axis passing through the center of said spherical bearing.

15. The improvement as defined in claim 14 wherein said connection also includes a vertical pin fixed to said mounting member and extending through said spherical bearing so as to define the axis of horizontal swinging movement.

16. The improvement as defined in claim 15 wherein said connection also includes a stop washer on the lower end of said pin spaced below said spherical bearing so as to enable a limited amount of vertical movement to take place between the said mounting member and crawler unit frame structure.

17. The improvement defined in claim 16 wherein said crawler unit includes a floor engaging member mounted on said frame structure for vertical movement with respect thereto and power operated means for effecting vertical movement of said ground engaging member between a raised position above the mine floor with said endless track assemblies in mine floor engagement and a lowered position in mine floor engagement with said endless track assemblies out of operative mine floor engagement.

18. The improvement defined in claim 13 wherein said crawler unit includes a floor engaging member mounted on said frame structure for vertical movement with respect thereto and power operated means for effecting vertical movement of said ground engaging member between a raised position above the mine floor with said endless track assemblies in mine floor engagement and a lowered position in mine floor engagement with said endless track assemblies out of operative mine floor engagement.

* * * * *